United States Patent
Crawford (12)

(10) Patent No.: US 9,762,540 B2
(45) Date of Patent: *Sep. 12, 2017

(54) POLICY BASED CONTENT FILTERING

(71) Applicant: Fortinet, Inc., Sunnyvale, CA (US)

(72) Inventor: William J. Crawford, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,422

(22) Filed: Jul. 4, 2015

(65) Prior Publication Data

US 2015/0312220 A1  Oct. 29, 2015

Related U.S. Application Data

(63) Continuation of application No. 14/093,142, filed on Nov. 29, 2013, which is a continuation of application No. 13/526,510, filed on Jun. 18, 2012, now Pat. No. 8,656,479, which is a continuation of application No. 13/114,292, filed on May 24, 2011, now Pat. No.
(Continued)

(51) Int. Cl.
*H04L 29/06* (2006.01)

(52) U.S. Cl.
CPC .......... *H04L 63/0236* (2013.01); *H04L 63/02* (2013.01); *H04L 63/0245* (2013.01); *H04L 63/0281* (2013.01); *H04L 63/20* (2013.01)

(58) Field of Classification Search
CPC ...... H04L 63/02–63/0281; H04L 63/20; H04L 63/166–63/168
See application file for complete search history.

(56) References Cited

U.S. PATENT DOCUMENTS

| 4,688,250 A | 8/1987 | Corrington et al. |
| 5,708,780 A | 1/1998 | Levergood et al. |

(Continued)

OTHER PUBLICATIONS

Non-Final Rejection for U.S. Appl. No. 14/452,292 mailed May 8, 2015.
(Continued)

*Primary Examiner* — Alexander Lagor
*Assistant Examiner* — Kevin Bechtel
(74) *Attorney, Agent, or Firm* — Hamilton, DeSanctis & Cha LLP

(57) ABSTRACT

Methods and systems for processing application-level content of network service protocols are described. According to one embodiment, a network connection is received at a networking subsystem of a firewall. The connection is characterized by a source IP address, a destination IP address and a network service protocol. The network service protocol of the network connection is determined. A matching firewall policy is identified for the connection. When the connection is allowed, it is redirected to a proxy module that is configured to support the network service protocol. A content processing configuration scheme identified by the matching firewall policy is retrieved that includes multiple content processing configuration settings, specifying whether a particular type of content filtering is to be performed, for each of multiple network service protocols. Application-level content of a packet stream associated with the network connection is reconstructed and filtered based on the applicable content processing configuration settings.

16 Claims, 9 Drawing Sheets

| | 504 Source | 505 Destination | 506 Schedule | 507 Service | 508 Action | 509 Configuration Scheme | 510 Enable | 511 Options |
|---|---|---|---|---|---|---|---|---|
| 501 1 | Internal_all | External_all | Always | Http | Allow | Scheme 3 | ☐ | Modify Delete |
| 502 2 | MachineA | External_all | Always | Ftp | Allow | Scheme 2 | ☐ | Modify Delete |
| 503 5 | Internal_all | External_all | Always | Any | Allow | Scheme 1 | ☐ | Modify Delete |
| ... | ... | ... | ... | ... | ... | ... | ... | ... |

Policy  To Port: External

Create

500

Related U.S. Application Data 8,205,251, which is a continuation of application No. 11/283,891, filed on Nov. 22, 2005, now Pat. No. 7,966,654.

(56) References Cited

U.S. PATENT DOCUMENTS

| | | | |
|---|---|---|---|
| 5,790,548 | A | 8/1998 | Sistanizadeh et al. |
| 5,826,029 | A | 10/1998 | Gore et al. |
| 6,058,420 | A | 5/2000 | Davis |
| 6,151,679 | A | 11/2000 | Friedman et al. |
| 6,393,565 | B1 | 5/2002 | Lockhart et al. |
| 6,516,053 | B1 | 2/2003 | Ryan et al. |
| 6,728,885 | B1 | 4/2004 | Taylor et al. |
| 7,076,650 | B1 | 7/2006 | Sonnenberg |
| 7,171,492 | B1 | 1/2007 | Borella et al. |
| 7,284,267 | B1 | 10/2007 | McArdle et al. |
| 7,409,709 | B2 | 8/2008 | Smith et al. |
| 7,441,017 | B2 | 10/2008 | Watson et al. |
| 7,966,654 | B2 | 6/2011 | Crawford |
| 8,166,474 | B1 | 4/2012 | Delco et al. |
| 8,205,251 | B2 | 6/2012 | Crawford |
| 8,656,479 | B2 | 2/2014 | Crawford |
| 8,813,215 | B2 | 8/2014 | Crawford |
| 2002/0078382 | A1 | 6/2002 | Sheikh et al. |
| 2002/0099825 | A1 | 7/2002 | Fertell et al. |
| 2003/0041266 | A1* | 2/2003 | Ke ............ H04L 12/4641 726/15 |
| 2003/0115075 | A1 | 6/2003 | Zunke |
| 2004/0015725 | A1 | 1/2004 | Boneh et al. |
| 2004/0230791 | A1 | 11/2004 | Boebert et al. |
| 2004/0230795 | A1* | 11/2004 | Armitano ............ G06F 21/6218 713/165 |
| 2005/0120138 | A1 | 6/2005 | Carmello et al. |
| 2005/0132227 | A1* | 6/2005 | Reasor ............ G06F 21/50 726/4 |
| 2005/0182969 | A1 | 8/2005 | Ginter et al. |
| 2005/0193429 | A1* | 9/2005 | Demopoulos ....... H04L 63/0254 726/23 |
| 2005/0273850 | A1 | 12/2005 | Freund |
| 2007/0118893 | A1 | 5/2007 | Crawford |
| 2007/0214263 | A1* | 9/2007 | Fraisse ............ G06F 17/30867 709/225 |
| 2007/0280243 | A1 | 12/2007 | Wray et al. |
| 2010/0138908 | A1 | 6/2010 | Vennelakanti et al. |
| 2011/0225646 | A1 | 9/2011 | Crawford |
| 2012/0254978 | A1 | 10/2012 | Crawford |
| 2013/0305343 | A1 | 11/2013 | Krywaniuk |
| 2014/0090013 | A1 | 3/2014 | Crawford |
| 2014/0090014 | A1 | 3/2014 | Crawford |
| 2014/0351918 | A1 | 11/2014 | Crawford |

OTHER PUBLICATIONS

Non-Final Rejection for U.S. Appl. No. 14/093,133 mailed Jun. 3, 2014.
Notice of Allowance for U.S. Appl. No. 11/283,891 mailed May 10, 2011.
Final Rejection for U.S. Appl. No. 11/283,891 mailed May 10, 2011.
Non-Final Rejection for U.S. Appl. No. 11/283,891 mailed Oct. 13, 2009.
Non-Final Rejection for U.S. Appl. No. 13/114,292 mailed Apr. 5, 2012.
Notice of Allowance for U.S. Appl. No. 13/114,292 mailed May 7, 2012.
Wack et al., "Guidelines on Firewalls and Firewall Policy." Recommendations of the National Institute of Standards and Technology. NIST Special Publication 800-41, Jan. 2002, 74 pages.
Non-Final Rejection for U.S. Appl. No. 14/093,142 mailed Feb. 11, 2014.
Notice of Allowance for U.S. Appl. No. 13/526,510 mailed Jan. 6, 2014.
Non-Final Rejection or U.S. Appl. No. 13/526,510 mailed Jan. 24, 2013.
Notice of Allowance for U.S. Appl. No. 14/093,133 mailed Jul. 14, 2014.
Petition for Inter Partes Review of U.S. Pat. No. 7,966,654 Under 35 U.S.C. §§ 311-319 and 37 C.F.R. §§ 42.1-80, 42.100-123 *Sophos Limited and Sophos Inc.* v *Fortinet, Inc.* 66 pgs.
Patent Owner Fortinet, Inc.'s Preliminary Response Pursuant to 37 C.F.R. § 42.107. Case IPR2015-00910. U.S. Pat. No. 7,966,654. *Sophos Limited and Sophos Inc.* v *Fortinet, Inc.* 46 pgs.
Decision Denying Institution of Inter Partes Review 35 U.S.C. § 314(a) and 37 C.F.R. § 42.108. Case IPR2015-00910. U.S. Pat. No. 7,966,654. *Sophos Limited and Sophos Inc.* v *Fortinet, Inc.* 21 pgs.
Petition for Inter Partes Review of U.S. Pat. No. 8,205,251 Under 35 U.S.C. §§ 311-319 and 37 C.F.R. §§ 42.1-80, 42.100-123. *Sophos Limited and Sophos Inc.* v *Fortinet, Inc.* 66 pgs.
Patent Owner Fortinet, Inc.'s Preliminary Response Pursuant to 37 C.F.R. § 42.107. Case IPR2015-00911. U.S. Pat. No. 8,205,251. *Sophos Limited and Sophos Inc.* v *Fortinet, Inc.* 47 pgs.
Decision Denying Institution of Inter Partes Review 37 C.F.R. § 42.108. Case IPR2015-00911. U.S. Pat. No. 8,205,251. *Sophos Limited and Sophos Inc.* v *Fortinet, Inc.* 18 pgs.
Petition for Inter Partes Review of U.S. Pat. No. 8,656,479 Under 35 U.S.C. §§ 311-319 and 37 C.F.R. §§ 42.1-80, 42.100-123. *Sophos Limited and Sophos Inc.* v *Fortinet, Inc.* 62 pgs.
Patent Owner Fortinet, Inc.'s Preliminary Response Pursuant to 37 C.F.R. § 42.107. Case IPR2015-00912. U.S. Pat. No. 8,656,479. *Sophos Limited and Sophos Inc.* v *Fortinet, Inc.* 42 pgs.
Decision Denying Institution of Inter Partes Review 37 C.F.R. § 42.108. Case IPR2015-00912. U.S. Pat. No. 8,656,479. *Sophos Limited and Sophos Inc.* v *Fortinet, Inc.* 18 pgs.
Final Rejection for U.S. Appl. No. 14/452,292 mailed Nov. 23, 2015.
Examiner's Answer to Appeal Brief for U.S. Appl. No. 14/093,142 mailed Apr. 16, 2015.
Appeal Brief for U.S. Appl. No. 14/093,142 filed Feb. 11, 2015 (2015).
Notice of Allowance for U.S. Appl. No. 14/452,292 mailed Apr. 12, 2017.
Non-Final Rejection for U.S. Appl. No. 11/283,891 mailed Apr. 15, 2011.
Final Rejection for U.S. Appl. No. 11/283,891 mailed Jul. 15, 2010.
Final Rejection for U.S. Appl. No. 14/093,142 mailed Jul. 2, 2014.

* cited by examiner

Figure 3

Configuration Scheme
- Scheme 1 — Modify / Delete
- Scheme 2 — Modify / Delete
- Scheme 3 — Modify / Delete
- ...

Create

Figure 4

Scheme 4

| Options | HTTP | FTP | SMTP | IMAP | POP3 | SMB/CIFS | |
|---|---|---|---|---|---|---|---|
| Antivirus Scan | ☐ | ☐ | ☐ | ☐ | ☐ | ☐ | |
| Filename Block | ☐ | ☐ | ☐ | ☐ | ☐ | ☐ | |
| Quarantine | ☐ | | ☐ | ☐ | ☐ | ☐ | ◁ |
| Banned Word | ☐ | | ☐ | ☐ | ☐ | | |
| Spam Block | | | | | | | ◁ |
| URL Block | ☐ | | | | | | ◁ |
| URL Exempt | ☐ | | | | | | |
| Option A | ☐ | ☐ | ☐ | ☐ | ☐ | ☐ | |
| Option B | ☐ | ☐ | ☐ | ☐ | ☐ | ☐ | |
| Option C | ☐ | ☐ | ☐ | ☐ | ☐ | ☐ | |
| ... | ... | ... | ... | ... | ... | ... | |

| Policy | | | | | | To Port | External | | |
|---|---|---|---|---|---|---|---|---|---|
| ID | 504 Source | 505 Destination | 506 Schedule | 507 Service | 508 Action | | 509 Configuration Scheme | 510 Enable | 511 Options |
| 501  1 | Internal_all | External_all | Always | Http | Allow | | Scheme 3 | ☐ | Modify Delete |
| 502  2 | MachineA | External_all | Always | Ftp | Allow | | Scheme 2 | ☐ | Modify Delete |
| 503  5 | Internal_all | External_all | Always | Any | Allow | | Scheme 1 | ☐ | Modify Delete |
| ... | ... | ... | ... | ... | ... | | ... | ... | ... |

Create

Figure 5

Policy [ 1 ]
Source [ Internal_All ]
Destination [ External_All ]
Schedule [ Always ]
Service [ Any ]
Action [ Allow ]
Configuration Scheme [ Scheme 1 ]
...

Figure 6

| Config Name | 703 HTTP Service | 704 SMTP Service | 705 IMAP Service | 706 POP3 Service | 707 FTP Service | 708 Options |
|---|---|---|---|---|---|---|
| 701 Strict | Banned Word [x]<br>Url Block [x]<br>AV Scan [x]<br>File Block [x]<br>... | AV Scan [x]<br>File Block [x]<br>Frag Email [ ]<br>Pass [ ]<br>Spam block [x]<br>... | AV Scan [x]<br>File Block [x]<br>Frag Email [ ]<br>Pass [ ]<br>Spam block [x]<br>... | AV Scan [x]<br>File Block [x]<br>Frag Email [ ]<br>Pass [ ]<br>Spam block [x]<br>... | AV Scan [x]<br>File Block [x]<br>... | Modify, Delete |
| 702 Scan | Banned Word [x]<br>Url Block [x]<br>AV Scan [x]<br>File Block [ ]<br>... | AV Scan [x]<br>File Block [ ]<br>Frag Email [ ]<br>Pass [ ]<br>Spam block [ ]<br>... | AV Scan [x]<br>File Block [ ]<br>Frag Email [ ]<br>Pass [ ]<br>Spam block [ ]<br>... | AV Scan [x]<br>File Block [ ]<br>Frag Email [ ]<br>Pass [ ]<br>Spam block [ ]<br>... | AV Scan [x]<br>File Block [ ]<br>... | Modify, Delete |
| ... | | | | | | |
| None | | | | | | |

Figure 7

POLICY BASED CONTENT FILTERING

CROSS-REFERENCE TO RELATED APPLICATIONS

This application is a continuation of U.S. patent application Ser. No. 14/093,142, filed on Nov. 29, 2013, which is a continuation of U.S. patent application Ser. No. 13/526,510, filed on Jun. 18, 2012, now U.S. Pat. No. 8,656,479, which is a continuation of U.S. patent application Ser. No. 13/114,292 filed on May 24, 2011, now U.S. Pat. No. 8,205,251, which is a continuation of U.S. patent application Ser. No. 11/283,891 filed on Nov. 22, 2005, now U.S. Pat. No. 7,966,654, each of which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2005-2015, Fortinet, Inc.

BACKGROUND

Field

Embodiments of the present invention generally relate to network security. In particular, embodiments of the present invention relate to application-level content processing of network service protocols using a firewall.

Description of the Related Art

Security threats have evolved dramatically over the past 10 years, moving from network-level, connection-oriented attacks to application-level, agent-based attacks. Conventional networking devices (firewalls) can deal with network-level packet processing; for example, conventional firewalls can stop packets that do not come from a valid source, and VPN gateways can encrypt packets on the fly, making it safe for them to traverse the Internet.

But today's critical network threats, like viruses and worms, are embedded in the application-level contents of packet streams. Enormous processing power is needed to detect and stop these application-layer threats by extracting the content from multiple packets, reconstructing the original content, and scanning it for the telltale signs of attacks or for inappropriate content.

A firewall is typically implemented as a hardware/software appliance having a number of physical networking interfaces for the incoming and outgoing network traffic. Firewalls can be software-implemented and installed on a stand-alone computer, or they can be full-blown hardware appliances placed in a network to filter traffic going between multiple computers and/or the Internet. Network traffic enters one of these interfaces and, after filtering and other appropriate processing, is routed to a remote host typically attached to a different physical interface.

In a firewall, processing of network traffic is performed in accordance with a set of specific rules, which collectively form a firewall policy. The firewall policy dictates how the firewall should handle network traffic associated with specific applications such as web browsers, email or telnet. Exemplary rules include filtering of banned words, blocking specific URLs, blocking transmission of specific file types, antivirus scans, blocking of spam, etc. The firewall policy is usually created by the network administrator and is based on the information security policy of the respective organization.

Conventional firewalls were capable of blocking traffic at the packet level but were not intelligent enough to examine the content of those packets and to protect against application-layer threats. Modern firewalls have the ability to examine the content of various network traffic streams and appropriately react to threats transferred within the content of the traffic stream. With the growth of these abilities of the firewalls, there has also been a growth in the number of options and settings that an administrator would need to configure to ensure a secure network.

Many existing firewall systems use global configuration settings, such as global lists of URLs to block, lists of spam addresses, options to scan for viruses, spam, and others similar parameters. These settings are applied globally to all policies within the firewall.

This approach, however, does not provide much flexibility to the administrator. For example it may be desirable to block general staff members of an organization from accessing certain websites that don't necessarily contain objectionable material but may be a work distraction. On the other hand, staff managers may not need to be restricted from accessing the same websites. Using global configuration options to enable the above firewall configuration presents a difficult task. In other words, the existing firewall systems, which are often configured using global settings, tend to apply the same firewall configuration scheme to all the network content passing through the firewall.

Therefore, what is needed is a firewall system providing a flexible and effective control over configuration parameters applied to filtering and/or processing of various network content. Such a system would achieve an optimal content processing performance without compromising the security of the protected network.

SUMMARY

Methods and systems are described for processing application-level content of network service protocols. According to one embodiment, an incoming network connection is received at a networking subsystem of a firewall device. The incoming connection is characterized by a source Internet Protocol (IP) address, a destination IP address and a network service protocol. The network service protocol of the incoming network connection is determined by the networking subsystem. Whether to allow or deny the incoming connection is determined by the networking subsystem by identifying a matching firewall policy from among multiple predefined firewall policies based on the source IP address, the destination IP address and the network service protocol and applying packet-layer firewall rules associated with the matching firewall policy. When the incoming connection is allowed, the incoming network connection is redirected by the networking subsystem to a proxy module of a multiple proxy modules within the firewall device that is configured to support the network service protocol. A content processing configuration scheme identified by the matching firewall policy is retrieved by the proxy module. The content processing configuration scheme includes multiple administrator-configurable content processing configuration settings, specifying whether a particular type of content filtering is to be performed, for each of multiple network service protocols. Application-level content spanning multiple packets of a packet stream associated with the incoming network connection are processed by the proxy module by: (i)

reconstructing the application-level content, including extracting and buffering content from the multiple packets; and (ii) filtering the application-level content based on those content processing configuration settings that are applicable to the determined network service protocol.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 3 and 4 illustrate graphical user interface screen shots, which may be used to define one or more configuration schemes in accordance with various embodiments of the present invention.

FIGS. 5 and 6 illustrate graphical user interface screen shots for displaying and adjusting parameters of firewall policies in accordance with various embodiments of the present invention.

FIGS. 7 and 8 illustrate graphical user interface screen shots in accordance with alternative embodiments of the present invention.

DETAILED DESCRIPTION

Figure 1:
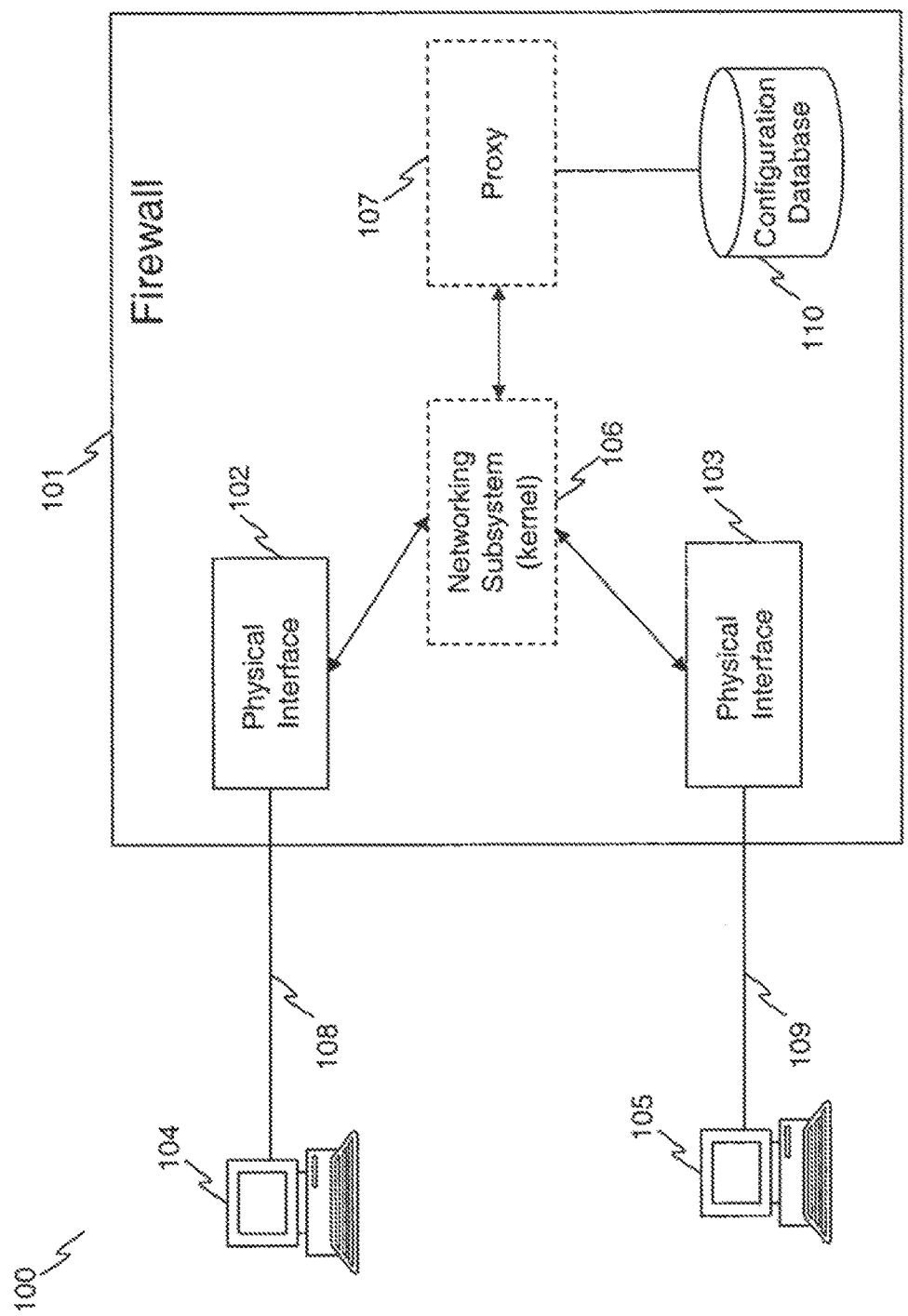
FIG. 1 depicts a conceptual block-diagram of a firewall system in accordance with an embodiment of the present invention.

Methods and systems are described for processing application-level content of network service protocols. In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Embodiments of the present invention are directed to methods and systems that substantially obviate one or more of the above and other problems associated with conventional techniques for configuring firewalls to filter and/or otherwise process network content.

The inventor recognized that it would have been advantageous to provide methods and systems, which would enable more granular control over firewall settings. Such configuration flexibility was not permitted under the conventional techniques.

Firewalls and other filtering gateways have become common security devices for improving computer network security. As more features and functionality are added to these devices they become quite complex to configure. By associating configuration schemes with firewall policies, configuration can be simplified without compromising flexibility. Administrators have more options to filter different traffic streams based on their type and sources. They also have increased flexibility to be able to filter traffic on a per user basis, through authentication mechanisms tied to various filtering options.

Generally, firewall policies are designed to control the flow of network traffic through the firewall. A typical firewall policy defines a set of rules applied to handling of the entire passing network traffic or any specific portion thereof. The portion of the network traffic to which a predetermined firewall policy applies may be specified using, for example, the network address of the source entity, the network address of the destination entity as well as the networking protocol used in the transmission. Different firewall policies may be assigned to different transmission protocols, which, in turn, implement different networking services.

When a specific network connection is initiated, the connection will commonly have an associated source network address, destination network address and service port identifier. This information is gathered by the firewall and checked against existing firewall policies. If the connection information matches a specific firewall policy, the firewall applies the relevant policy to the connection.

Low-level, network layer firewalls generally may only permit or reject the network traffic, typically at the network packet level, and they make their decisions based on the source and destination addresses and the associated network ports in individual IP packets. In such firewalls, the set of rules associated with the firewall policy may generally specify which network traffic is permitted to proceed and which is rejected and the firewall policy may be defined in terms of source and destination IP addresses together with the associated communication ports. This information is contained in individual IP packets and is retrieved by the firewall upon packet inspection.

Higher-level, content-filtering application layer firewalls generally are hosts running proxy servers, which permit no traffic directly between networks, and which perform elaborate logging and auditing of traffic passing through them. Because the proxy applications are software components running on the firewall, they are used to perform logging and access control. In such systems, the firewall policy may provide an additional option for handling of the network traffic, which may include re-directing specific packets to another routine or program, such as a proxy, which may perform a specified operation upon the packets or gather the content of the packets for deeper examination and/or logging. Because of the greater flexibility of the network traffic processing in the proxy, the configuration of the proxy may involve a substantial number of configuration parameters.

In accordance with an embodiment of the invention, in a firewall system having the ability to redirect the communication stream to the proxy program, each firewall policy is provided with an associated collection of settings. These settings may generally include, but are not limited to, various types of filters. By having the ability to associate a collection of settings (hereinafter referred to as "configuration scheme") with individual firewall polices, the administrator of the inventive firewall system has a greater control over how various communication pathways are filtered.

In an exemplary embodiment of the inventive firewall system, a configuration scheme is associated with a specific firewall policy by means of a scheme identifier, a variable, comprising numeric information, character information or binary bits, that is stored in a data structure associated with the firewall policy, which is called a "policy structure." The policy structure may be disposed within the kernel of the firewall computer system. When a new communication session matching a particular firewall policy is initiated, this session inherits the scheme identifier value from the corresponding policy structure. The proxy program, to which the communication connection is redirected, then retrieves this identifier value from the communication connection structure and uses it to look up the scheme settings from the configuration database or, alternatively, from a local cache. The configuration database in the inventive system may be as simple as a text file holding records of information or as complex as a fully featured database system.

FIG. 1 illustrates a topology of a firewall-protected network 100 in accordance with an embodiment of the present invention. Two network entities 104 and 105 are connected to opposite sides of a physical device (the firewall) 101, which monitors the network traffic 108, 109 passing between them. The firewall 101 may drop or alter some of this traffic based on a predefined set of rules. Therefore, the content of the network traffic 108 may not be identical to the content of the traffic 109. According to an embodiment of the inventive technique, the two network entities 104 and 105 are connected to the firewall 101 by a direct link. In an alternative embodiment, the connection is accomplished through a routed network (not shown).

As shown in FIG. 1, the firewall 101 is disposed within the network communication channel between the two user systems 104 and 105 and monitors network packet exchanges between them. As would be appreciated by those of skill in the art, for some well-known protocols, such as TCP, the transmitted network packets can be inspected for known threats or questionable content by one or more scanning engines. When a packet that matches one of the known signatures is detected, the inventive firewall system may generate a log message or set off an alarm, and the packet may be dropped. In one embodiment of the inventive system, the entire connection between the two users would be dropped as well.

As would be also appreciated by those of skill in the art, in many cases, the rules or signatures used to detect questionable data cannot be applied to individual packets.

Stream protocols, such as TCP, will break up data into smaller chunks during transmission, but the detection heuristics must be applied to the entire data stream rather than the individual packets. Therefore, in the inventive system, the data would be first buffered by the firewall 101 in order to extract the data stream, and then the filtering rules would be applied to this stream. In many cases, the packets would be redirected by the networking subsystem 106 of the kernel of the firewall 101 to a user space application (proxy) 107 that builds and interprets the data buffer.

The firewall system shown in FIG. 1 includes physical network interfaces 102 and 103, and the aforesaid networking subsystem 106, which may be implemented as a part of the kernel of the operating system of the firewall appliance 101. The networking subsystem 106 routes the packets between the physical interfaces 102 and 103 and transfers the data between various logical subsystems on the firewall system 101. Several types of stream-based data are intercepted by the networking subsystem 106 and buffered by a proxying module 107 for future processing. It should be noted that while FIG. 1 shows only physical interfaces, in another embodiment of the inventive firewall, one or both of the interfaces 102 and 103 may be logical interfaces.

The networking subsystem 106 may be configured to intercept data transmissions formatted in accordance with various networking protocols including, without limitation, Server Message Block/Common Internet File System (SMB/CIFS), instant messaging (IM) protocols (e.g., AOL Instant Messenger (AIM), MICROSOFT Network (MSN) messenger, YAHOO! Messenger, SKYPE), and peer-to-peer (P2P) protocols (e.g., FASTTRACK, BEEP, GNUTELLA, AVALANCHE, BITTORRENT). Additionally, Simple Mail Transfer Protocol (SMTP), Post Office Protocol 3 (POP3), Internet Message Access Protocol (IMAP), HyperText Transfer Protocol (HTTP), File Transfer Protocol (FTP), telnet, etc. The intercepted data packets are routed to the proxy module 107 for re-assembly, inspection and other processing.

In one embodiment of the invention, the proxying module 107 is implemented in the OS kernel. In an alternative embodiment, the proxy 107 is implemented in the form of an application executing in the user space provided by the operating system of the firewall appliance 101. The proxying module 107 assembles the formatted packets intercepted by the networking subsystem 106 in accordance with the specification of the respective communication protocol to arrive at the transmission content. Depending on the specifics of the used communication protocol, an embodiment of the inventive system may provide for re-ordering of the data packets prior to, or during the transmission re-assembly.

A configuration database 110 stores various firewall policies, configuration schemes and other parameters used by the firewall system 101. The stored parameters are retrieved from the database 110 by the proxy 107. In one embodiment of the inventive system, the proxying module 107 is configured to support one network protocol. In such implementation, multiple proxying subsystems may be provided if the system is designed to handle multiple protocols. Additionally or alternatively, multiple instances of proxy 107 may be executed to support the same network protocol or different network protocols. Moreover, the proxy 107 may be designed to support the entire communication language of the respective protocol or any portion thereof. Finally, the proxy 107 may use an external program to retrieve various configuration settings from the database 110. Likewise, an external program may be used to apply various filters to the network transmission content processed by the proxy 107.

Figure 2:
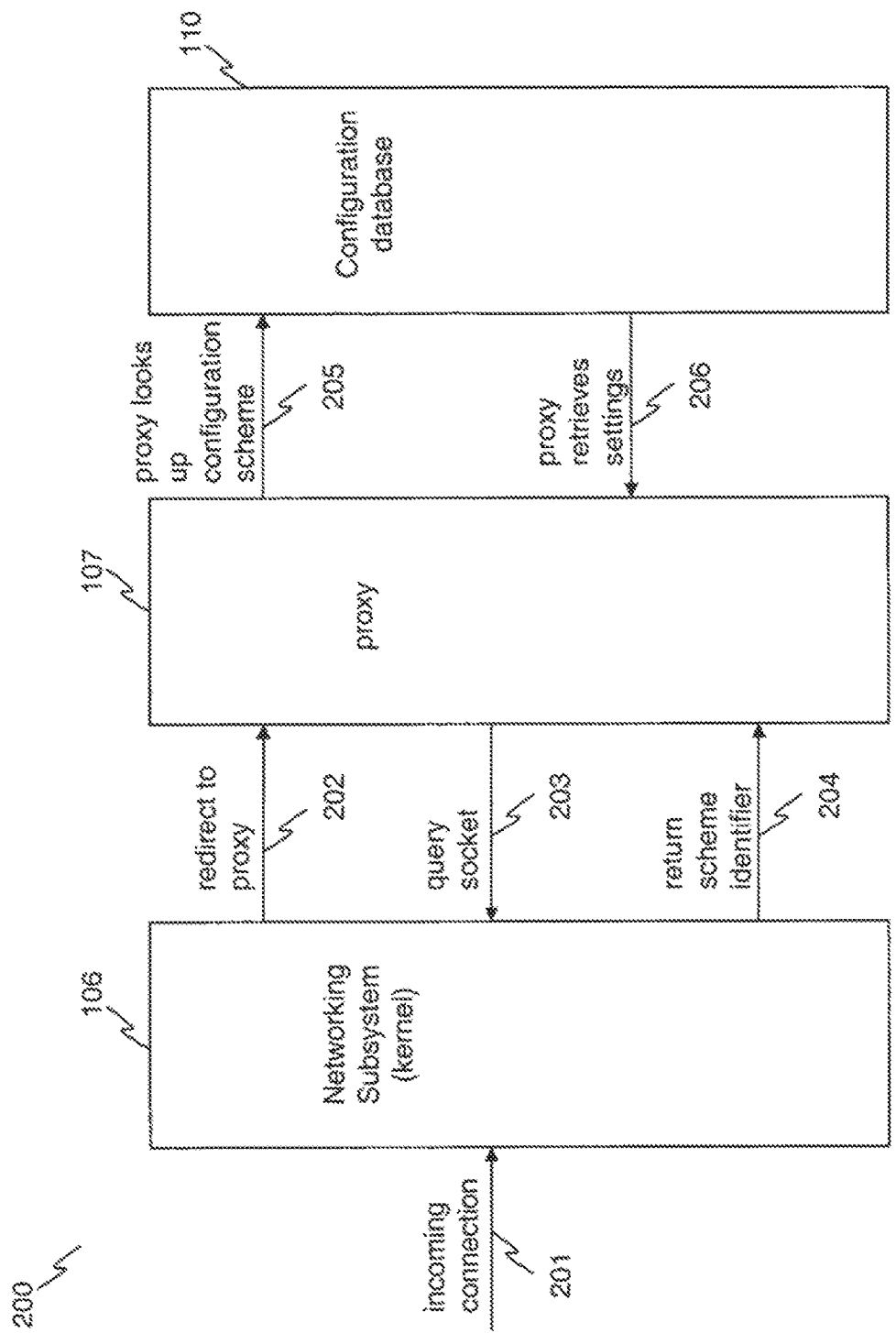
FIG. 2 illustrates an operating sequence of a firewall system to establish a basic network communication session in accordance with an embodiment of the present invention.

FIG. 2 illustrates an operating sequence of the inventive firewall system associated with establishment of a basic network communication session. An incoming connection 201 is accepted by the networking subsystem 106 of the firewall kernel after a lookup of an applicable firewall policy. In the shown sequence, the policy indicates that the session should be redirected (at 202) to the user level proxy 107. The proxy 107 performs any needed initialization and then queries the kernel (at 203) to retrieve the configuration scheme associated with the session. Once the scheme identifier has been retrieved (at 204) the proxy queries (at 205) the configuration database (110) to retrieve the settings for the configuration scheme matching the specified identifier. Once the settings are retrieved (at 206) the proxy 107 can continue with any filtering tasks or other tasks necessary to handle the networking session.

In an embodiment of the inventive concept, multiple configuration schemes may be specified by the network administrator using, for example, a graphical user interface or a command line interface of the firewall system 101. The settings specified by the administrator, as well as other appropriate parameters, may be stored in the configuration database 110 for subsequent retrieval. In an exemplary embodiment of the inventive technique, each created configuration scheme is assigned a unique identifier value, which may or may not be displayed to the administrator. This identifier value is subsequently stored in one or more data structures associated with the corresponding firewall policy and used to retrieve the appropriate configuration scheme.

The configuration database 110 may be implemented on the same computer platform as the rest of the firewall 101. This database may be implemented using any suitable database system, such as general-purpose relational database systems distributed by ORACLE Corporation, IBM Corporation and MICROSOFT Corporation. In an alternative embodiment of the invention, a special-purpose embedded database may be utilized. In yet alternative embodiment, the configuration database may be implemented using file system facilities of the firewall 101. Finally, the database system 110 may be implemented on separate computer hardware from the rest of the firewall 101.

FIGS. 3 and 4 display exemplary embodiments of a graphical user interface which may be used by an administrator of the inventive firewall system in defining one or more configuration schemes. Specifically, the interface 300 shown in FIG. 3 displays a list of existing configuration schemes 301-304. Each of the schemes 301-304 may be assigned a unique name or alias for easy reference. Using the interface 300, new schemes may be created and the existing schemes may be modified or deleted.

The interface 400 shown in FIG. 4 displays a detailed view of a specific configuration scheme. The displayed exemplary scheme 400 is arranged into separate protocol sections (columns 401-406). Each such section may include multiple configuration settings corresponding to the specific protocol. The protocols shown in FIG. 4 include HTTP, FTP, SMTP, IMAP, POP3, SMB/CIFS. However, the invention is not limited only to the shown protocols. Any other suitable protocols may be used. Normally, the inventive interface 400 only displays protocols supported by the proxy engine 107 of the firewall 101. However, as the proxy functionality is expanded to support additional networking protocols, the graphical user interface 400 may be configured, either manually or automatically, to display those additional protocols as well.

As will be appreciated by those of skill in the art, not all configuration settings are appropriate for all protocols. Therefore, in the inventive interface 400, some settings are not available for some protocols. For example, the e-mail spam block is not available for non-email protocols. Various parameters of the specific configuration scheme displayed using the interface 400 may be input or adjusted by the network administrator by means of toggle options (checkboxes), named selections (drop down combo boxes), multi-selections, as well as number and text based entries. The configuration scheme may include lists of various items, such as lists of banned words or lists of HTTP URLs to be blocked. Such lists may be linked to appropriate graphical primitive(s) within the interface 400, such as items 408-410 shown in FIG. 4. Upon administrator's selection of the appropriate graphical primitive, the corresponding list may be displayed and the administrator may be provided with an ability to add to or otherwise modify its content.

As it would be appreciated by those of skill in the art, the inventive concept is by no means limited only to the shown parameters and settings. Various other settings and parameters may be displayed and appropriately configured by the interfaces 300 and 400. Moreover, the interface 400 may be configured to automatically display new parameters and configuration options when it detects that the proxy module 107 of the firewall 101 has been enhanced to support new protocols as well as new filtering and other content processing capabilities.

In addition to the capability to create and/or modify firewall configuration schemes, an embodiment of the present invention is additionally provided with a graphical user interface or, alternatively, a command line interface enabling an administrator to specify and manage multiple firewall policies. The policy settings may also be stored in the configuration database 110. In an embodiment of the invention, at least a portion of information descriptive of the policy settings is stored in the kernel of the firewall 101.

Exemplary embodiments of the policy-setting graphical user interfaces of the inventive firewall system 101 are illustrated in FIGS. 5 and 6. Specifically, exemplary interface 500 shown in FIG. 5 displays a list of all firewall policies in effect. The shown interface 500 is organized in a tabular form with each of the rows 501, 502 and 503 corresponding to firewall policies with policy identification numbers 1, 2 and 5, respectively. Parameters in columns 504, 505 and 507 specify source network address, destination network address and transmission protocol to which specific listed policy is made applicable. Column 506 specifies when the specific policy has effect. Column 508 contains settings specifying how the corresponding network traffic should be handled. The configuration scheme for each effective policy is specified in column 509. The network administrator is provided with an option to enable or disable any specific policy and to modify or delete it, see columns 510 and 511.

FIG. 6 illustrates graphical user interface 600 for displaying and adjusting various individual parameters of a specific firewall policy. The policy parameters included in the interface 600 generally correspond to the columns of interface 500. Using the interface 600, the administrator may modify any appropriate policy settings.

As described in details above, any specific firewall policy may be provided with an associated configuration scheme such that networking protocols supported by the policy are filtered or otherwise processed in accordance with the settings of that configuration scheme. The relevant configuration scheme is identified and assigned to a session when the session is created. At that point, the configuration scheme identifier is written into the policy structure in the kernel so that it can be transferred into new session structures as new sessions connect. If more than one policy is defined, different policies may use either the same configuration scheme, all different configuration schemes, or any combination of the above. It is also permissible, in an embodiment of the invention, to apply no configuration scheme to a policy. In such a case, the policy becomes a conventional firewall policy with no filtering capabilities. In another embodiment of the invention, multiple configuration schemes may be assigned to a single firewall policy.

In another embodiment of the invention, the policy-based filters are implemented using user-authenticated groups. Specifically, certain firewall policies may utilize some form of user authentication. To enable utilization of such policies, one or more users on the network may be grouped together into one or more named groups of users, for example Accounting Team. It should be noted that certain groups may consist of only one user. A specific firewall configuration scheme may be assigned to a user group or an individual user. As would be appreciated by those of skill in the art, the utilization of user group-based firewall policies and associated configuration schemes enables flexible assignment of different levels of use restrictions of various network services to different groups of users.

Figure 8:
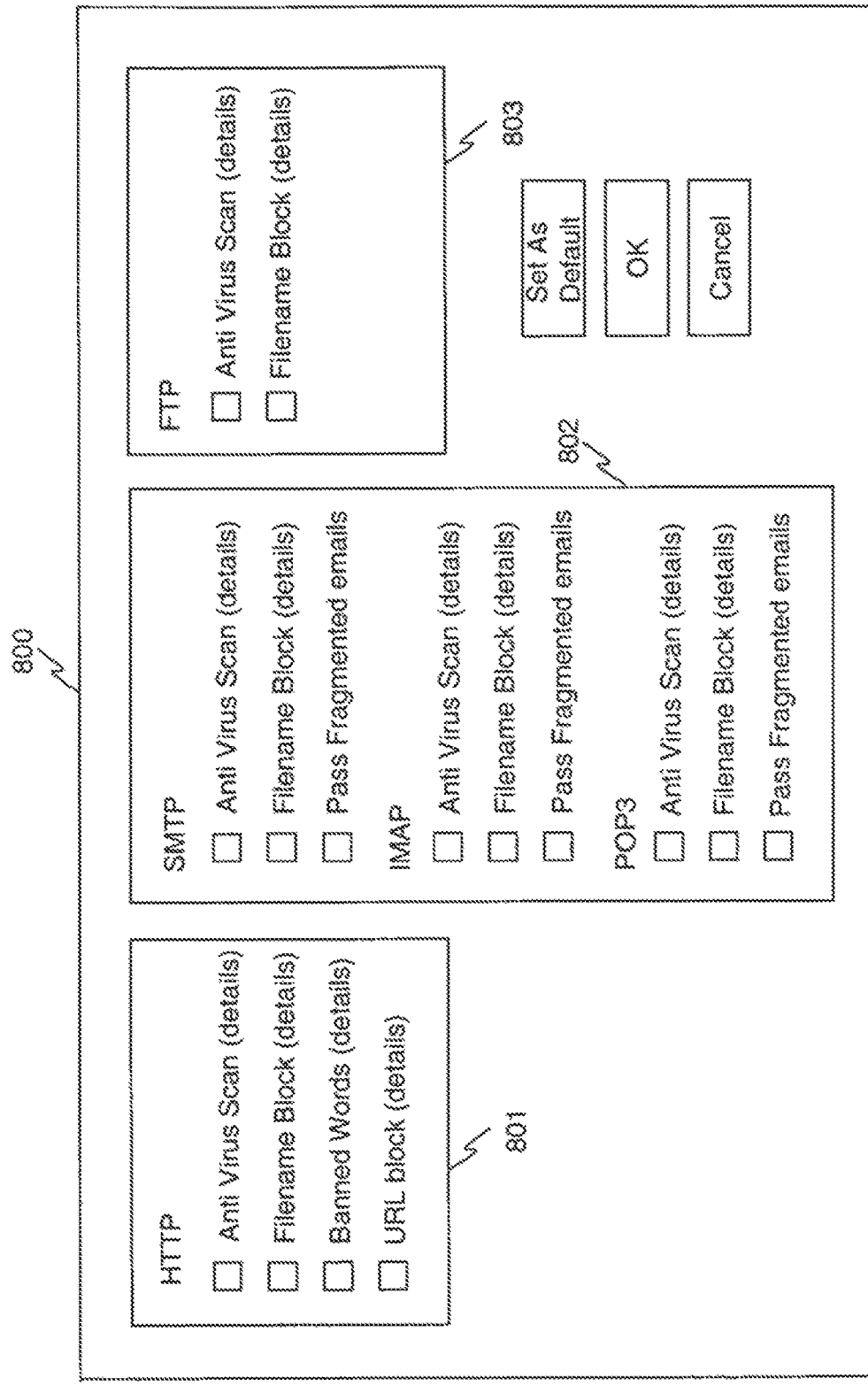

FIGS. 7 and 8 illustrate an alternative embodiment of the user interface of the inventive firewall system. In the interface shown in FIG. 7, multiple configuration schemes are displayed on the same page together with their parameters. Each of the rows 701 and 702 corresponds to a specific configuration scheme, while each of the columns 703-707 displays settings corresponding to one specific networking protocol. On the other hand, the interface 800 shown in FIG. 8 may be used to edit various parameters associated with a specific configuration scheme. In the interface 800, shown in that figure, various protocols are grouped together in accordance with protocol type, including web protocol 801, mail protocols 802 and file transfer protocol 803. The configuration scheme parameters displayed in FIG. 8 generally correspond to parameters included in each of the rows 701 or 702 of FIG. 7.

Figure 9:
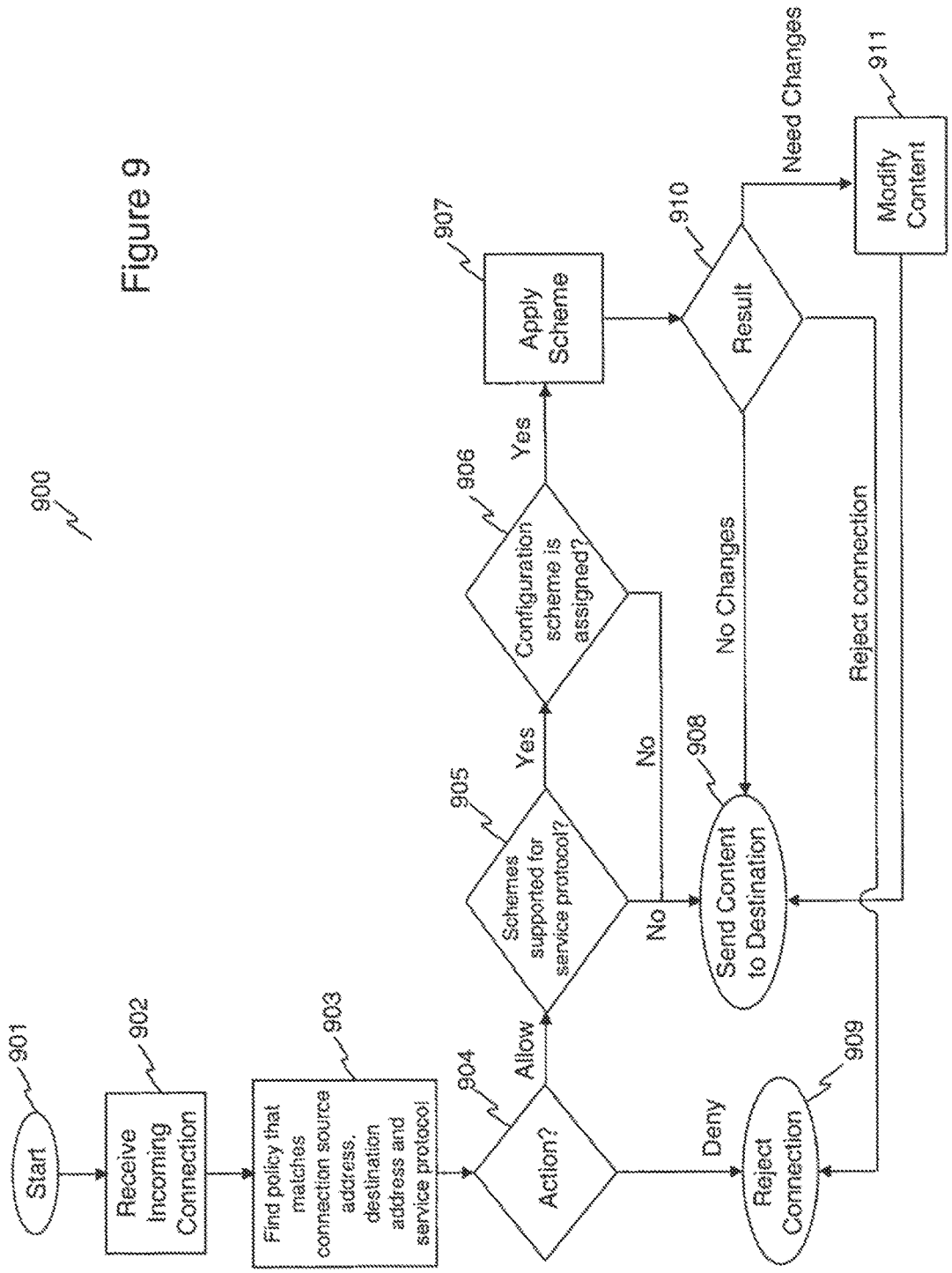
FIG. 9 is a flow diagram illustrating network content processing in accordance with an embodiment of the present invention.

FIG. 9 illustrates exemplary operating sequence 900 of an embodiment of the inventive firewall system 101. Upon the receipt of the incoming connection, at step 902, the inventive firewall system 101 uses the connection information to identify the applicable firewall policy, see step 903. The relevant connection information may include, without limitation, the connection source and destination addresses, as well as connection service protocol determined in accordance to the connection port number information. The necessary connection information may be extracted from the network packets intercepted by the networking subsystem 106 of the kernel.

At step 904, the system applies packet-layer firewall rules to determine whether the connection should be allowed. Non-compliant connections are rejected at step 909. The allowed connections are checked against a list of service protocols supported by the proxy 107, see step 905. Content formatted according to non-supported protocols is sent directly to the destination at step 908. If the connection protocol is supported by the proxy 107, at step 906, the system checks whether a specific configuration scheme is assigned to the connection, and, if so, applies the scheme at step 907. At step 910, the system checks whether the transmission content needs to be modified and modifies the content, if appropriate, at step 911.

Figure 10:
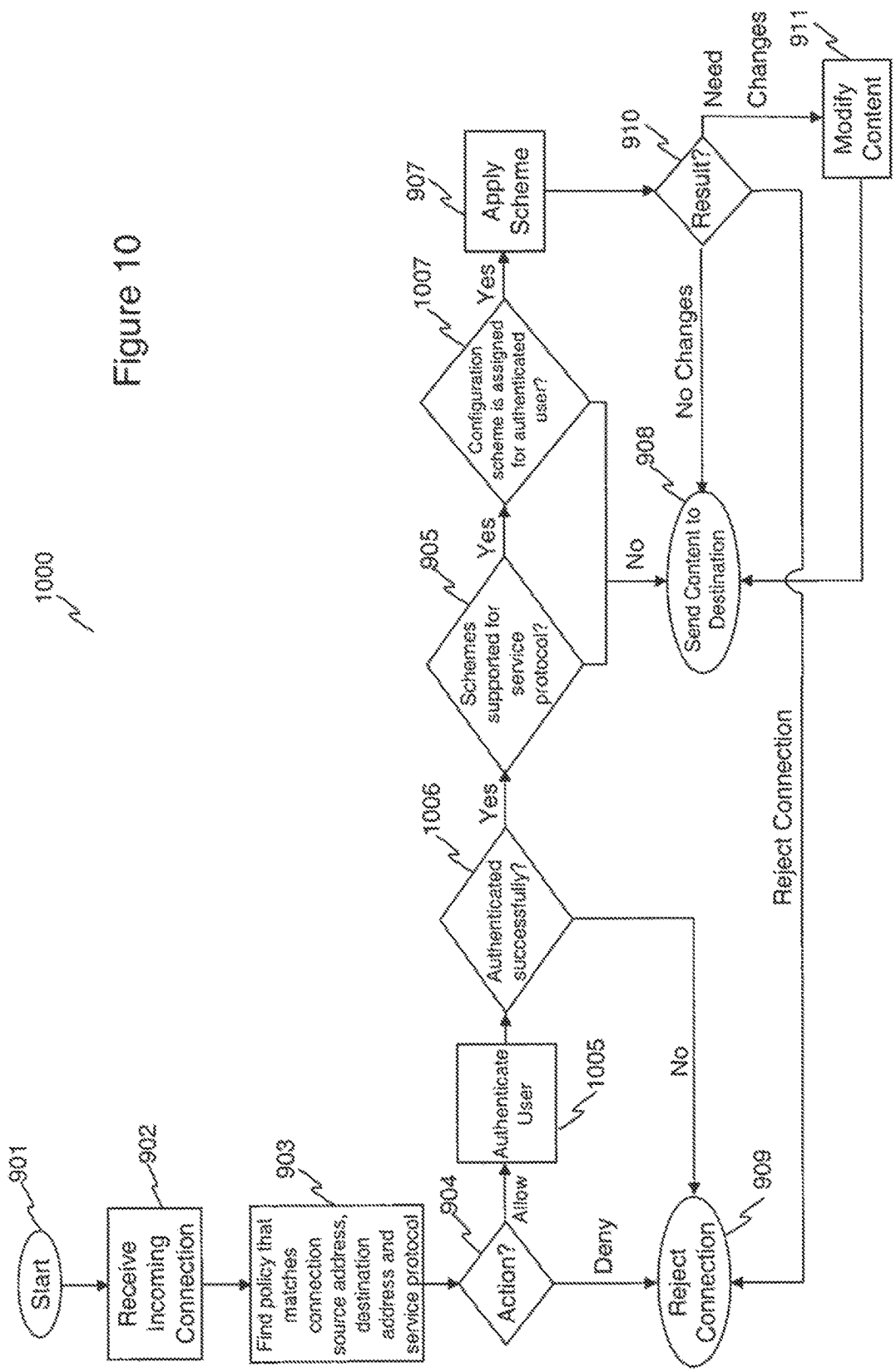
FIG. 10 is a flow diagram illustrating network content processing in accordance with an alternative embodiment of the present invention.

FIG. 10 illustrates an exemplary operating sequence 1000 of an alternative embodiment of the inventive firewall system 101. The sequence 1000 differs from the sequence 900 of FIG. 9 in applying additional authentication steps 1005 and 1006 to the networking connection. Specifically, upon determination, at step 904, that the connection satisfies the packet-layer rules, the system authenticates the user and rejects the connection if the authentication fails, see steps 1005 and 1006, respectively. In addition, in the sequence shown in FIG. 10, at step 1007, the inventive system checks for a configuration scheme assigned to the user/usergroup, which, in turn, corresponds to the firewall policy that applies to the current connection. The found scheme is then applied at step 907. The remaining steps of the sequence 1000 are equivalent to the corresponding steps of the sequence 900 of FIG. 9.

Figure 11:
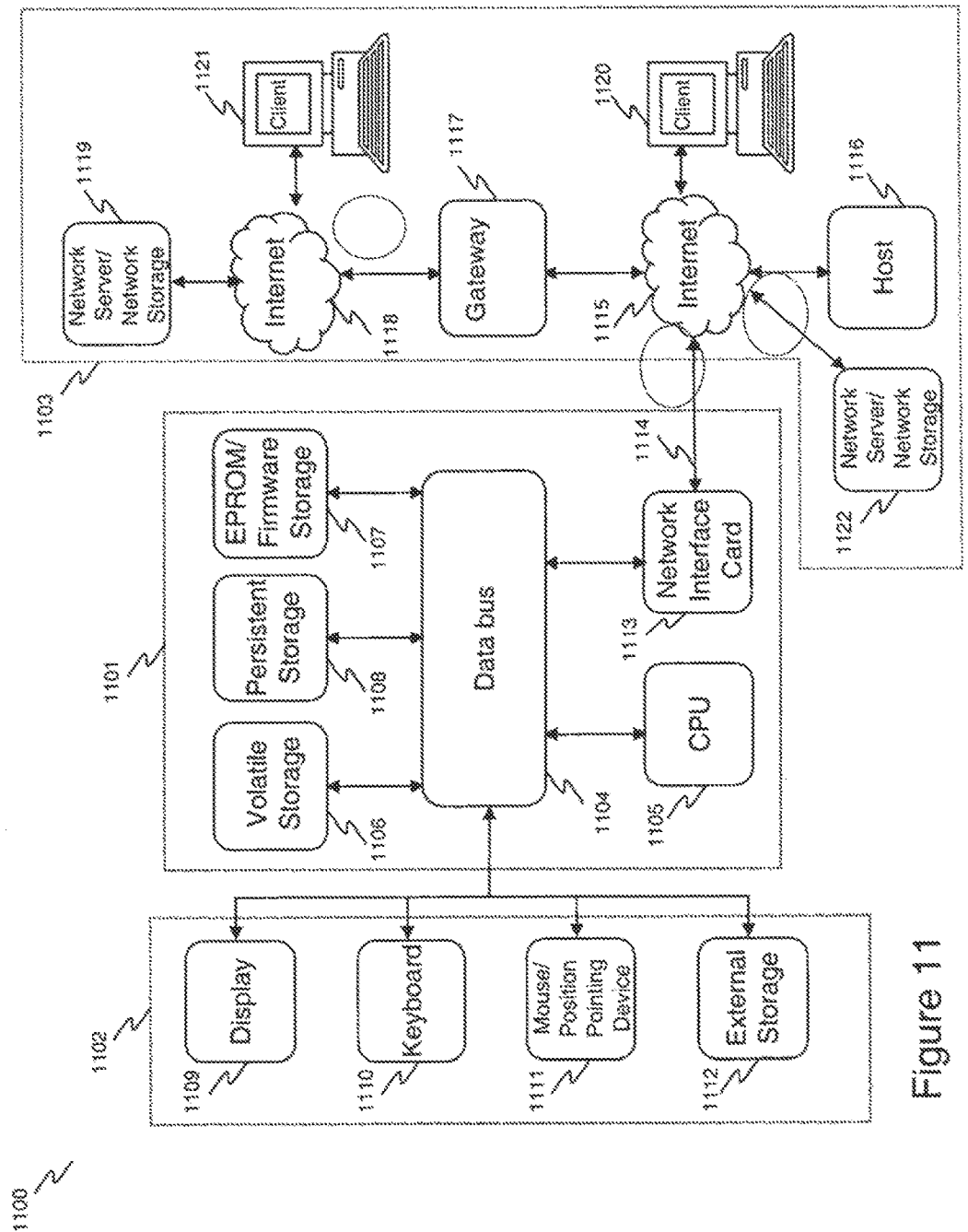
FIG. 11 illustrates a computer platform with which embodiments of the present invention may be employed.

An example of a hardware platform in accordance with an embodiment of the present invention will now be described. FIG. 11 is a block diagram that illustrates an embodiment of a computer platform 1100 upon which an embodiment of the inventive methodology may be implemented. The system 1100 includes a computer/server platform 1101, peripheral devices 1102 and network resources 1103.

The computer platform 1101 may include a data bus 1104 or other communication mechanism for communicating information across and among various parts of the computer platform 1101, and a processor 1105 coupled with bus 1101 for processing information and performing other computational and control tasks. Computer platform 1101 also includes a volatile storage 1106, such as a random access memory (RAM) or other dynamic storage device, coupled to bus 1104 for storing various information as well as instructions to be executed by processor 1105. The volatile storage 1106 also may be used for storing temporary variables or other intermediate information during execution of instructions by processor 1105. Computer platform 1101 may further include a read only memory (ROM or EPROM) 1107 or other static storage device coupled to bus 1104 for storing static information and instructions for processor 1105, such as basic input-output system (BIOS), as well as various system configuration parameters. A persistent storage device 1108, such as a magnetic disk, optical disk, or solid-state flash memory device is provided and coupled to bus 1101 for storing information and instructions.

Computer platform 1101 may be coupled via bus 1104 to a display 1109, such as a cathode ray tube (CRT), plasma display, or a liquid crystal display (LCD), for displaying information to a system administrator or user of the computer platform 1101. An input device 1110, including alphanumeric and other keys, is coupled to bus 1101 for communicating information and command selections to processor 1105. Another type of user input device is cursor control device 1111, such as a mouse, a trackball, or cursor direction keys for communicating direction information and command selections to processor 1104 and for controlling cursor movement on display 1109. This input device typically has two degrees of freedom in two axes, a first axis (e.g., x) and a second axis (e.g., y), that allows the device to specify positions in a plane.

An external storage device 1112 may be connected to the computer platform 1101 via bus 1104 to provide an extra or removable storage capacity for the computer platform 1101. In an embodiment of the computer system 1100, the external removable storage device 1112 may be used to facilitate exchange of data with other computer systems.

Embodiments of the invention relate to the use of computer system 1100 for implementing the techniques described herein. In an embodiment, the inventive content processing systems 300 and 400 may reside on a machine such as computer platform 1101. In an embodiment, database 313 may be deployed on a machine such as computer platform 1101. According to one embodiment of the invention, the techniques described herein are performed by computer system 1100 in response to processor 1105 executing one or more sequences of one or more instructions contained in the volatile memory 1106. Such instructions may be read into volatile memory 1106 from another computer-readable medium, such as persistent storage device 1108. Execution of the sequences of instructions contained in the volatile memory 1106 causes processor 1105 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1105 for execution. The computer-readable medium is just one example of a non-transitory machine-readable medium, which may carry or otherwise embody instructions for implementing any of the methods and/or techniques described herein. Such a medium may take many forms, including but not limited to, non-volatile media and volatile media. Non-volatile media includes, for example, optical or magnetic disks, such as storage device 1108. Volatile media includes dynamic memory, such as volatile storage 1106.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge.

Various forms of computer readable media may be involved in carrying one or more sequences of one or more instructions to processor 1105 for execution. For example, the instructions may initially be carried on a magnetic disk from a remote computer.

Alternatively, a remote computer can load the instructions into its dynamic memory and send the instructions over a telephone line using a modem. A modem local to computer system 1100 can receive the data on the telephone line and use an infrared transmitter to convert the data to an infrared signal. An infrared detector can receive the data carried in the infrared signal and appropriate circuitry can place the data on the data bus 1104. The bus 1104 carries the data to the volatile storage 1106, from which processor 1105 retrieves and executes the instructions. The instructions received by the volatile memory 1106 may optionally be stored on persistent storage device 1108 either before or after execution by processor 1105. The instructions may also be downloaded into the computer platform 1101 via Internet using a variety of network data communication protocols well known in the art.

The computer platform 1101 also includes a communication interface, such as network interface card 1113 coupled to the data bus 1104. Communication interface 1113 provides a two-way data communication coupling to a network link 1114 that is connected to a local network 1115. For example, communication interface 1113 may be an integrated services digital network (ISDN) card or a modem to provide a data communication connection to a corresponding type of telephone line. As another example, communication interface 1113 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 1113 sends and receives electrical, electromagnetic or optical signals that carry digital data streams representing various types of information.

Network link 1113 typically provides data communication through one or more networks to other network resources. For example, network link 1114 may provide a connection through local network 1115 to a host computer 1116, or a network storage/server 1117. Additionally or alternatively, the network link 1113 may connect through gateway 1117 to the wide-area or global network 1118, such as an Internet. Thus, the computer platform 1101 can access network resources located anywhere on the Internet 1118, such as a remote network storage/server 1119. On the other hand, the computer platform 1101 may also be accessed by clients located anywhere on the local area network 1115 and/or the Internet 1118. The network clients 1120 and 1121 may themselves be implemented based on the computer platform similar to the platform 1101.

Local network 1115 and the Internet 1118 both use electrical, electromagnetic or optical signals that carry digital data streams. The signals through the various networks and the signals on network link 1114 and through communication interface 1113, which carry the digital data to and from computer platform 1101, are exemplary forms of carrier waves transporting the information.

Computer platform 1101 can send messages and receive data, including program code, through the variety of network(s) including Internet 1118 and LAN 1115, network link 1114 and communication interface 1113. In the Internet example, when the system 1101 acts as a network server, it might transmit a requested code or data for an application program running on client(s) 1120 and/or 1121 through Internet 1118, gateway 1117, local area network 1115 and communication interface 1113. Similarly, it may receive code from other network resources.

The received code may be executed by processor 1105 as it is received, and/or stored in persistent or volatile storage devices 1108 and 1106, respectively, or other non-volatile storage for later execution. In this manner, computer system 1101 may obtain application code in the form of a carrier wave.

It should be noted that embodiments of the present invention are not limited to any specific firewall system. For example, the inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of various embodiments of the present invention will be apparent to those skilled in the art from consideration of the specification and practice of the invention disclosed herein. Various aspects and/or components of the described embodiments may be used singly or in any combination in the computerized network content processing system. It is intended that the specification and examples be considered as exemplary only, with a true scope and spirit of the invention being indicated by the following claims.

What is claimed is:

1. A computer-implemented method for processing application-level content of network service protocols, the method comprising:

maintaining, by a firewall device, a plurality of configuration schemes, wherein each of the plurality of configuration schemes comprises a listing of a plurality of network service protocols, and wherein each of the plurality of configuration schemes defines, for each particular network service protocol in the plurality of network service protocols, a set of administrator-configurable content filtering process settings that indicates one or more particular content filtering processes to perform;

maintaining, by the firewall device, a security policy database including information defining a plurality of firewall security policies, wherein the information defining the plurality of firewall security policies includes, for each one of the plurality of firewall security policies, information identifying an associated one of the plurality of configuration schemes and an action to take with respect to a particular network session based on a plurality of (i) a set of one or more source Internet Protocol (IP) addresses, (ii) a set of one or more destination IP addresses and (iii) a network service protocol;

receiving an incoming network connection, at a networking subsystem of the firewall device, the incoming connection being characterized by a source Internet Protocol (IP) address, a destination IP address and a network service protocol;

determining, by the networking subsystem, the network service protocol of the incoming network connection;

determining, by the networking subsystem, whether to allow or deny the incoming network connection by identifying a matching firewall policy from among the plurality of firewall security policies based on the source IP address, the destination IP address and the network service protocol and applying packet-layer firewall rules associated with the matching firewall policy;

when the incoming network connection is allowed by the action to take of the matching firewall policy, then:

redirecting the incoming network connection, by the networking subsystem, to a proxy module of a plurality of proxy modules within the firewall device that is configured to support the network service protocol;

retrieving, by the proxy module, a content processing configuration scheme of the plurality of content processing configuration schemes identified by the matching firewall policy; and processing, by the proxy module, application-level content spanning a plurality of packets of a packet stream associated with the incoming network connection by:

reconstructing the application-level content, including extracting and buffering content from the plurality of packets; and filtering the application-level content based on those content filtering processes of the one or more particular content filtering processes specified by the content processing configuration scheme specified by the matching firewall policy that are applicable to the determined network service protocol.

2. The method of claim 1, wherein the network service protocol comprises HyperText Transfer Protocol (HTTP), File Transfer Protocol (FTP), Simple Mail Transfer Protocol (SMTP), Post Office Protocol 3 (POP3), Internet Message Access Protocol (IMAP) or Server Message Block/Common Internet File System (SMB/CIFS).

3. The method of claim 1, further comprising receiving from a network administrator, by the firewall device, via a graphical user interface, selections indicative of one or more content filtering process settings of the set of administrator-configurable content filtering process settings for each of a plurality of network service protocols.

4. The method of claim 1, wherein the determined network service protocol comprises HyperText Transport Protocol (HTTP) and said filtering the application-level content comprises applying to the application-level content a plurality of antivirus scanning, filename blocking, quarantining, banned word filtering and Uniform Resource Locator (URL) blocking.

5. The method of claim 1, wherein the determined network service protocol comprises File Transfer Protocol (FTP) and said filtering the application-level content of comprises applying to the application-level content a plurality of antivirus scanning, filename blocking and quarantining.

6. The method of claim 1, wherein the determined network service protocol comprises Simple Mail Transfer Protocol (SMTP), Post Office Protocol 3 (POP3) or Internet Message Access Protocol (IMAP) and said filtering the application-level content comprises applying to the application-level content a plurality of antivirus scanning, filename blocking, quarantining, banned word filtering and spam blocking.

7. The method of claim 1, wherein the determined network service protocol comprises Server Message Block/Common Internet File System (SMB/CIFS) and said filtering the application-level content comprises applying to the application-level content a plurality of antivirus scanning, filename blocking and quarantining.

8. The method of claim 7, wherein said filename blocking comprises blocking transmission of specific file types.

9. A non-transitory computer-readable storage medium embodying instructions, which when executed by a firewall device, cause the firewall device to perform a method for processing application-level content, the method comprising:

maintaining a plurality of configuration schemes, wherein each of the plurality of configuration schemes comprises a listing of a plurality of network service protocols, and wherein each of the plurality of configuration schemes defines, for each particular network service protocol in the plurality of network service protocols, a set of administrator-configurable content filtering process settings that indicates one or more particular content filtering processes to perform;

maintaining a security policy database including information defining a plurality of firewall security policies, wherein the information defining the plurality of firewall security policies includes, for each one of the plurality of firewall security policies, information identifying an associated one of the plurality of configuration schemes and an action to take with respect to a particular network session based on a plurality of (i) a set of one or more source Internet Protocol (IP) addresses, (ii) a set of one or more destination IP addresses and (iii) a network service protocol;

receiving an incoming network connection, at a networking subsystem of the firewall device, the incoming network connection being characterized by a source Internet Protocol (IP) address, a destination IP address and a network service protocol;

determining, by the networking subsystem, the network service protocol of the incoming network connection;

determining, by the networking subsystem, whether to allow or deny the incoming network connection by identifying a matching firewall policy from among the plurality of firewall security policies based on the source IP address, the destination IP address and the network service protocol and applying packet-layer firewall rules associated with the matching firewall policy;

when the incoming network connection is allowed by the action to take of the matching firewall policy, then:

redirecting the incoming network connection, by the networking subsystem, to a proxy module of a plurality of proxy modules within the firewall device that is configured to support the network service protocol;

retrieving, by the proxy module, a content processing configuration scheme of the plurality of content processing configuration schemes identified by the matching firewall policy; and processing, by the proxy module, application-level content spanning a plurality of packets of a packet stream associated with the incoming network connection by:

reconstructing the application-level content, including extracting and buffering content from the plurality of packets; and filtering the application-level content based on those content filtering processes of the one or more particular content filtering processes specified by the content processing configuration scheme specified by the matching firewall policy that are applicable to the determined network service protocol.

10. The non-transitory computer-readable storage medium of claim 9, wherein the network service protocol comprises HyperText Transfer Protocol (HTTP), File Transfer Protocol (FTP), Simple Mail Transfer Protocol (SMTP), Post Office Protocol 3 (POP3), Internet Message Access Protocol (IMAP) or Server Message Block/Common Internet File System (SMB/CIFS).

11. The non-transitory computer-readable storage medium of claim 9, wherein the method further comprises receiving from a network administrator, by the firewall device, via a graphical user interface, selections indicative of one or more content filtering process settings of the set of administrator-configurable content filtering process settings for each of a plurality of network service protocols.

12. The non-transitory computer-readable storage medium of claim 9, wherein the determined network service protocol comprises HyperText Transport Protocol (HTTP) and said filtering the application-level content comprises applying to the application-level content a plurality of antivirus scanning, filename blocking, quarantining, banned word filtering and Uniform Resource Locator (URL) blocking.

13. The non-transitory computer-readable storage medium of claim 9, wherein the determined network service protocol comprises File Transfer Protocol (FTP) and said filtering the application-level content of comprises applying to the application-level content a plurality of antivirus scanning, filename blocking and quarantining.

14. The non-transitory computer-readable storage medium of claim 9, wherein the determined network service protocol comprises Simple Mail Transfer Protocol (SMTP), Post Office Protocol 3 (POP3) or Internet Message Access Protocol (IMAP) and said filtering the application-level content comprises applying to the application-level content a plurality of antivirus scanning, filename blocking, quarantining, banned word filtering and spam blocking.

15. The non-transitory computer-readable storage medium of claim 9, wherein the determined network service protocol comprises Server Message Block/Common Internet File System (SMB/CIFS) and said filtering the application-level content comprises applying to the application-level content a plurality of antivirus scanning, filename blocking and quarantining.

16. The non-transitory computer-readable storage medium of claim 15, wherein said filename blocking comprises blocking transmission of specific file types.

* * * * *